US008598533B2

(12) United States Patent
Menge et al.

(10) Patent No.: US 8,598,533 B2
(45) Date of Patent: Dec. 3, 2013

(54) RADIATION DETECTION SYSTEM AND METHOD OF ANALYZING AN ELECTRICAL PULSE OUTPUT BY A RADIATION DETECTOR

(75) Inventors: Peter R. Menge, Novelty, OH (US); Clarisse Tur, Cleveland, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 376 days.

(21) Appl. No.: 12/966,908

(22) Filed: Dec. 13, 2010

(65) Prior Publication Data

US 2012/0132823 A1 May 31, 2012

Related U.S. Application Data

(60) Provisional application No. 61/286,512, filed on Dec. 15, 2009.

(51) Int. Cl.
 *G01T 3/08* (2006.01)
(52) U.S. Cl.
 USPC ............. 250/370.05; 250/362; 702/79; 708/6
(58) Field of Classification Search
 USPC .................... 250/370.05, 362; 702/79; 708/6
 See application file for complete search history.

(56) References Cited

U.S. PATENT DOCUMENTS

| | | | | |
|---|---|---|---|---|
| 3,603,888 A * | 9/1971 | Jones | | 327/50 |
| 4,629,894 A * | 12/1986 | Lelong | | 250/363.02 |
| 5,430,406 A | 7/1995 | Kolodziejczyk | | |
| 6,953,937 B2 * | 10/2005 | Reber et al. | | 250/395 |
| 7,525,101 B2 | 4/2009 | Grodzins | | |
| 7,626,178 B2 | 12/2009 | Ivan et al. | | |
| 7,649,175 B2 * | 1/2010 | Wellnitz | | 250/362 |
| 2007/0290136 A1 * | 12/2007 | Ivan | | 250/361 R |
| 2011/0095173 A1 * | 4/2011 | Menge et al. | | 250/262 |
| 2011/0114843 A1 * | 5/2011 | Kusner et al. | | 250/361 R |

FOREIGN PATENT DOCUMENTS

| JP | 56154686 A | 11/1981 |
|---|---|---|
| JP | 6005659 A | 1/1994 |

OTHER PUBLICATIONS

The International Search Report and Written Opinion for International Application No. PCT/US2010/060142 received from the International Searching Authority (ISA/KR) dated Aug. 2, 2011, 9 pages.

* cited by examiner

*Primary Examiner* — Casey Bryant
(74) *Attorney, Agent, or Firm* — Abel Law Group, LLP; Robert N. Young

(57) ABSTRACT

A radiation detection system can include a photosensor to receive light from a scintillator via an input and to send an electrical pulse at an output in response to receiving the light. The radiation detection system can also include a pulse analyzer that can determine whether the electrical pulse corresponds to a neutron-induced pulse, based on a ratio of an integral of a particular portion of the electrical pulse to an integral of a combination of a decay portion and a rise portion of the electrical pulse. Each of the integrals can be integrated over time. In a particular embodiment, the pulse analyzer can be configured to compare the ratio with a predetermined value and to identify the electrical pulse as a neutron-induced pulse when the ratio is at least the predetermined value.

20 Claims, 7 Drawing Sheets

RADIATION DETECTION SYSTEM AND METHOD OF ANALYZING AN ELECTRICAL PULSE OUTPUT BY A RADIATION DETECTOR

CROSS-REFERENCE TO RELATED APPLICATION

This application claims priority under 35 U.S.C. §119(e) to U.S. Patent Application No. 61/286,512 entitled "Radiation Detection System and Method of Analyzing an Electrical Pulse Output by a Radiation Detector," by Menge et al., filed Dec. 15, 2009, which is assigned to the current assignee hereof and incorporated herein by reference in its entirety.

FIELD OF THE DISCLOSURE

The present disclosure is directed to radiation detection systems and methods of analyzing electrical pulses output by radiation detectors.

RELATED ART

Radiation detectors are used in a variety of industrial applications. For example, scintillators can be used for medical imaging and for well logging in the oil and gas industry. Typically, scintillators have scintillator crystals made of an activated sodium iodide or other material that is effective for detecting gamma rays or neutrons. Generally, the scintillator crystals are enclosed in casings or sleeves that include a window to permit radiation-induced scintillation light to pass out of the crystal package. The light passes to a light-sensing device, such as a photomultiplier tube. The photomultiplier tube converts the light photons emitted from the crystal into electrical pulses. The electrical pulses can be processed by associated electronics and may be registered as counts that are transmitted to analyzing equipment.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

Figure 1:
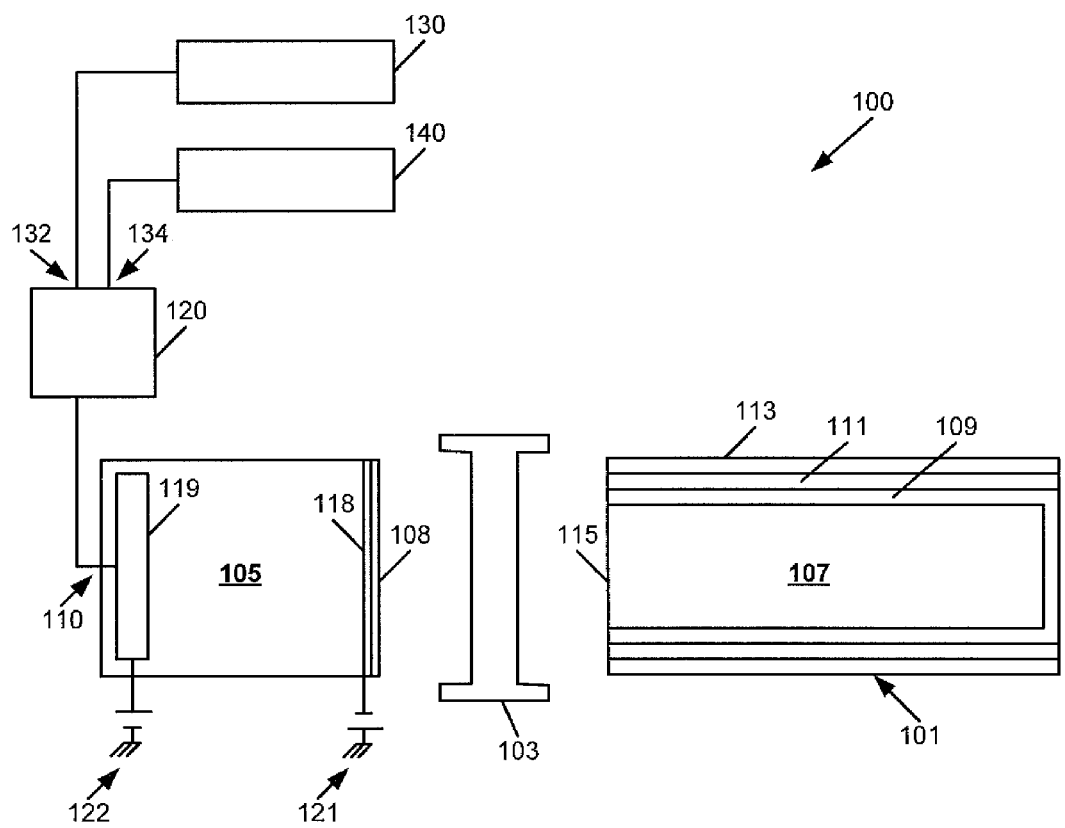
FIG. 1 includes a block diagram illustrating a particular embodiment of a radiation detection system.

FIG. 1 illustrates a particular embodiment of a radiation detection system 100. The radiation detection system 100 can include a scintillator 101 coupled to a photosensor 105. In one embodiment, the radiation detection system 100 can include a light pipe 103. Though the scintillator 101, the light pipe 103, and the photosensor 105 are illustrated separate from each other, the scintillator 101 and the photosensor 105 can be coupled to each other directly or via the light pipe 103. In one embodiment, the scintillator 101 and the photosensor 105 can be coupled to the light pipe 103 using an optical gel, bonding agent, fitted structural components, or any combination thereof.

The scintillator 101 can include a scintillating material 107 housed within a casing 113. The scintillating material 107 can include a material to detect neutrons, gamma radiation, other targeted radiation, or any combination thereof. For instance, the scintillating material 107 can include a material suitable for use with a dual gamma/thermal neutron detector. In an embodiment, the scintillating material 107 can include an organic material, such as a scintillating substance within an organic non-scintillating medium. For instance, the scintillating material can include $^6$Li, $^{10}$B, or $^{nat}$Gd within an organic liquid, gel, or polymer. In another example, the scintillating material 107 can include a phosphor screen including ZnS, $^6$Li, a layer of wavelength-shifting fiber, or any combination thereof. In another embodiment, the scintillating material 107 can include an inorganic material, such as a $Cs_2LiYCl_6$, $Cs_2LiYBr_6$, $Rb_2LiYCl_6$, another Elpasolite crystal, or another type of crystal.

In a particular embodiment, the scintillator 101 can include a thermalyzer or neutron moderator to moderate fast neutrons into thermal neutrons for which $^6$Li or $^{10}$B have higher interaction cross sections. The neutron moderator can include, for example, polyethylene surrounding the scintillator 101. In another embodiment, the $^6$Li or $^{10}$B can be dissolved in a hydrocarbon solvent that acts as a thermalyzer to slow fast neutrons to speeds compatible with scintillating materials including $^6$Li or $^{10}$B.

The scintillator 101 can also include a reflector 109. In one embodiment, the casing 113 can include a shock-absorbing member 111 disposed between the casing 113 and the reflector 109. Further, the casing 113 can include an output window 115 that is interfaced to an end of the scintillating material 107. The output window 115 can include glass or another transparent or translucent material suitable to allow photons emitted by the scintillator 101 to pass toward the photosensor 105. In an illustrative embodiment, an optical interface, such as clear silicone rubber, can be disposed between the scintillating material 107 and the output window 115. The optical interface can be polarized to align the reflective indices of the scintillating material 107 and the output window 115.

As illustrated, the light pipe 103 can be disposed between the photosensor 105 and the scintillator 101 and can facilitate optical coupling between the photosensor 105 and the scintillator 101. In one embodiment, the light pipe 103 can include a quartz light pipe, plastic light pipe, or another light pipe. In another embodiment, the light pipe 103 can comprise a silicone rubber interface that optically couples an output window 115 of the scintillator 101 with the input 108 of the photosensor 105. In some embodiments, multiple light pipes can be disposed between the photosensor 105 and the scintillator 101.

The photosensor 105 can comprise a photodiode, a photomultiplier tube (PMT), or a hybrid PMT that includes a photocathode and a semiconductor electron sensor. The photosensor 105 can be housed within a tube or housing made of a material capable of protecting electronics associated with the photosensor 105, such as a metal, metal alloy, other material, or any combination thereof.

The photosensor 105 can include an input 108 and an output 110, such as an interface to receive a coaxial cable or other article to transmit electrical signals. The photosensor 105 can receive, via the input 108, light from the scintillator 101, other sources, or a combination thereof. The photosensor 105 can be configured to send electrical pulses from the output 110 to the pulse analyzer 120, in response to light that the photosensor 105 receives. The pulse analyzer 120 and its operation are described in further detail later in this specification. The pulse analyzer 120 can be coupled to a pulse counter 130 that counts photons received at the photosensor 105 based on electrical pulses output by the photosensor 105 to the pulse analyzer 120. The pulse analyzer 120 may also be coupled to another pulse processing device 140. For example, the counter 130 can comprise a neutron counter, and the pulse processing device 140 can comprise a gamma radiation counter.

In a particular, illustrative embodiment, the photosensor 105 can be configured to receive light from the scintillator 101 via the input 108. Photons included in the light can strike a photocathode 118 of the photosensor 105 and transfer energy to electrons in a valence band of the photocathode 118. The electrons can become excited until they are emitted as electrons from a surface of the photocathode 118 that is opposite the input 108. In a particular embodiment, the surface of the photocathode 118 can include a layer of electropositive material that can facilitate emission of the electrons from the surface of the photocathode 118.

Electrons emitted by the photocathode 118 can be collected at an anode of the photosensor 105, and an electrical pulse or signal can be sent to the pulse analyzer 120 via the output 110. In an example, a first voltage 121, such as a supply voltage or other voltage, can be applied to the photocathode 118. Electrons emitted from the surface of the photocathode 118 can be accelerated, by the first voltage 121, to strike the surface of an electron detector 119. In addition, a second voltage 122, such as a reverse bias voltage or other voltage, can be applied to the electron detector 119. Energy from electrons entering the electron detector can produce carriers that are removed from the electron detector 119 by the reverse bias voltage 122, creating an electrical pulse.

In a particular embodiment, the photosensor 105 can receive light emitted by the scintillator 101 as a result of the scintillating material 107 receiving gamma radiation, neutrons, other targeted radiation, or any combination thereof. The photosensor 105 can send an electrical pulse to the pulse analyzer 120 after receiving such light. The pulse analyzer 120 can be configured to analyze the electrical pulse and to determine whether the electrical pulse corresponds to a gamma radiation-induced electrical pulse or a neutron-induced electrical pulse.

Figure 3:
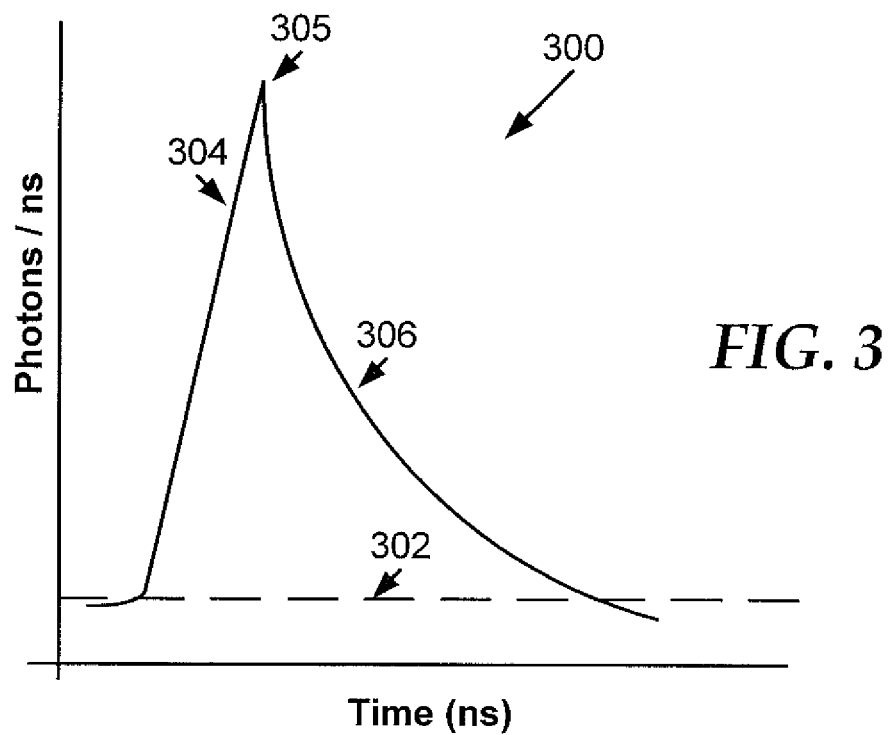
FIG. 3 includes a plot illustrating a particular embodiment of a shape of a gamma radiation-induced electrical pulse.
Figure 4:
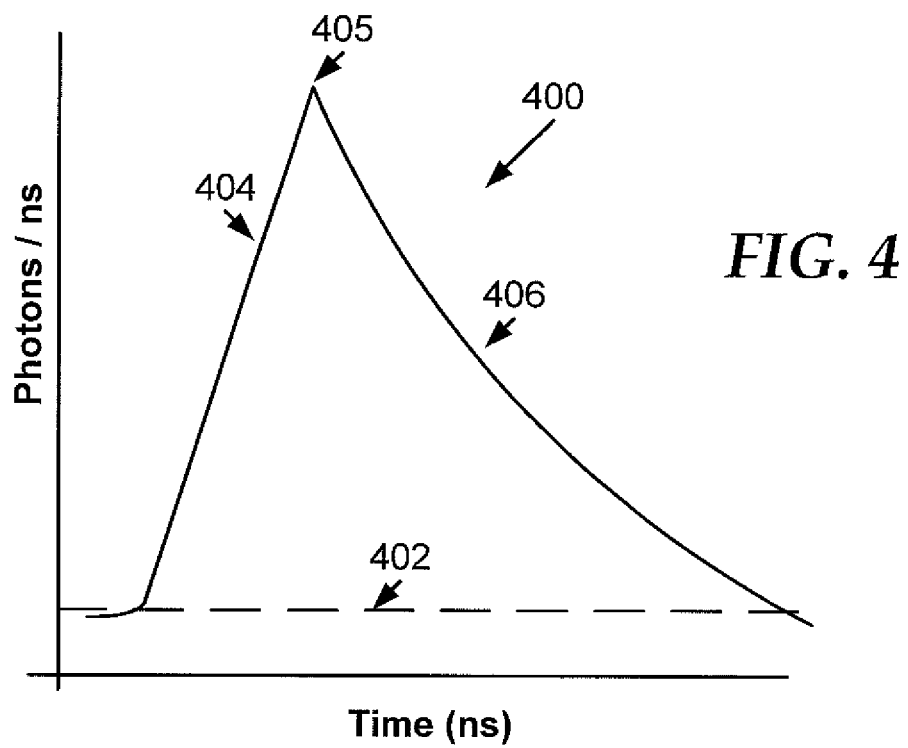
FIG. 4 includes a plot illustrating a particular embodiment of a shape of a neutron-induced electrical pulse.

In a particular embodiment, the pulse analyzer 120 can include a module or device, such as a field programmable gate array, another digital circuit, an analog circuit, or any combination thereof, to identify an electrical pulse as corresponding to a neutron-induced electrical pulse or a gamma radiation-induced electrical pulse, based on a shape of the electrical pulse. FIGS. 3 and 4 illustrate an example of differences in shape between a gamma radiation-induced electrical pulse and a neutron-induced electrical pulse. FIG. 3 illustrates a particular embodiment of a gamma radiation-induced electrical pulse 300. The pulse 300 can have a relatively fast rise portion 304, which extends from a threshold 302 to a peak 305 of the electrical pulse 300. The pulse 300 can have a relatively slow decay portion 306, which extends from the peak 305 of the electrical pulse 300 down to the threshold 302.

FIG. 4, on the other hand, illustrates a particular embodiment of a neutron-induced electrical pulse 400. The pulse 400 can also have a relatively fast rise portion 404, which extends from a threshold 402 to a peak 405 of the electrical pulse 400. However, the pulse 400 can have a more gradual decay portion 406 than the decay portion 306 of the gamma radiation-induced electrical pulse 300.

In a particular embodiment, the pulse analyzer 120 can exploit the difference in shape between electrical pulses and identify an electrical pulse as corresponding to a neutron-induced electrical pulse or a gamma radiation-induced electrical pulse, based on a ratio of an integral over time of a particular portion of the electrical pulse, to an integral over time of a total pulse. The particular portion can include, for example, a decay portion, a rise portion, another portion, or any combination thereof that includes less than the total pulse. As used herein, the phrase "total pulse" refers to a combination of the decay portion and a rise portion of the electrical pulse that are at or above a threshold. The combination of the decay portion and the rise portion can include a peak of the electrical pulse, an integration window around a highest reading of the electrical pulse, or a combination thereof.

Figure 5:
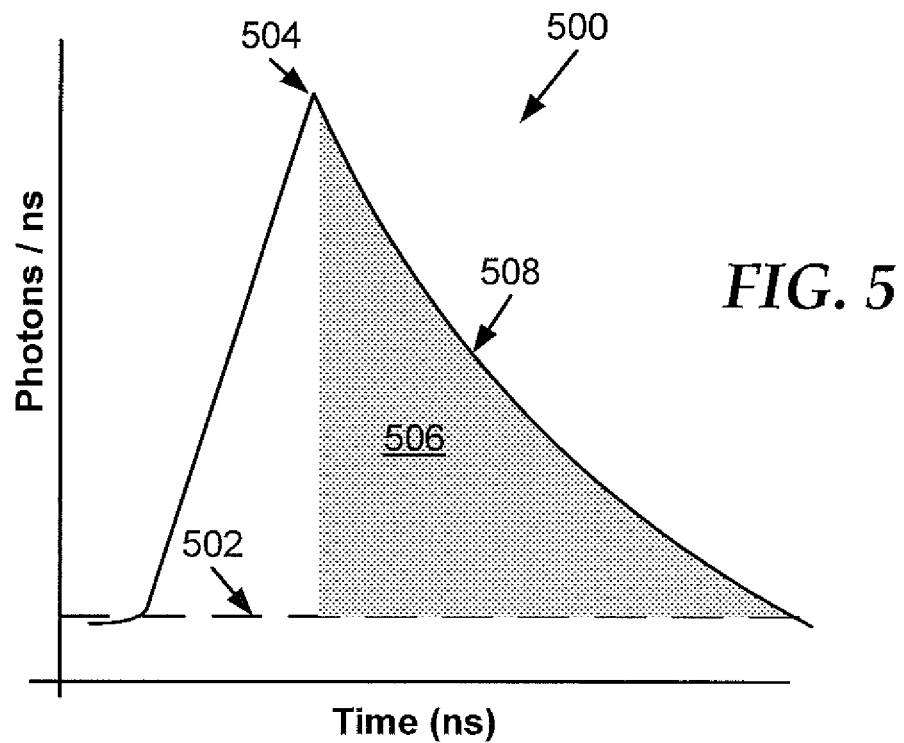
FIGS. 5 and 6 include plots illustrating another particular embodiment of a shape of a neutron-induced electrical pulse.
Figure 6:
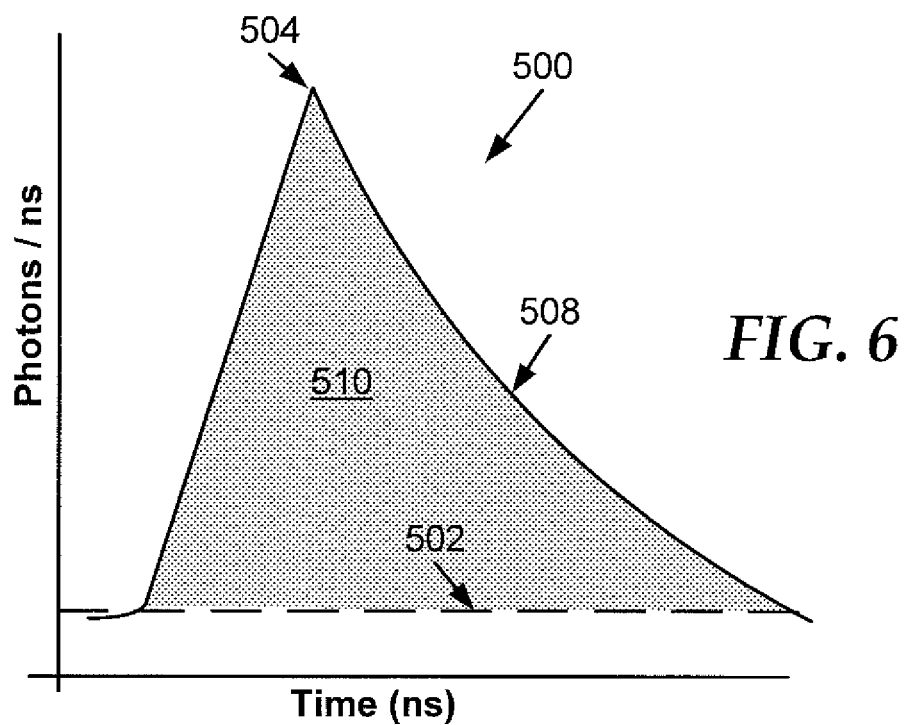

As an example of the calculated integrals, FIGS. 5 and 6 illustrate another particular embodiment of a neutron-induced electrical pulse 500. In this example, the pulse analyzer 120 can calculate an integral of the decay portion 508 over time, to determine an area 506, illustrated in FIG. 5, under the decay portion 508 and at or above the threshold 502. The integral can be calculated over a time that extends from a highest reading 504 down to the threshold 502, or from a pre-determined time after the highest reading 504 down to the threshold 502. Additionally, the pulse analyzer 120 can calculate an integral over time of the total pulse at or above the threshold 502, to determine an area 510, illustrated in FIG. 6, under the shape of the electrical pulse and at or above the threshold 502.

Though a peak 504 is illustrated in FIG. 5, the difficulty of finding where in time the peak 504 occurs may cause difficulties in determining a start of the decay portion 508 to be integrated (whether at the peak 504 or subsequent to the peak 504) and in integrating the total electrical pulse at or above the threshold 502. As a result, various techniques to approximate the peak can be used for purposes of integrating the total pulse to find the area 510.

Figure 7:
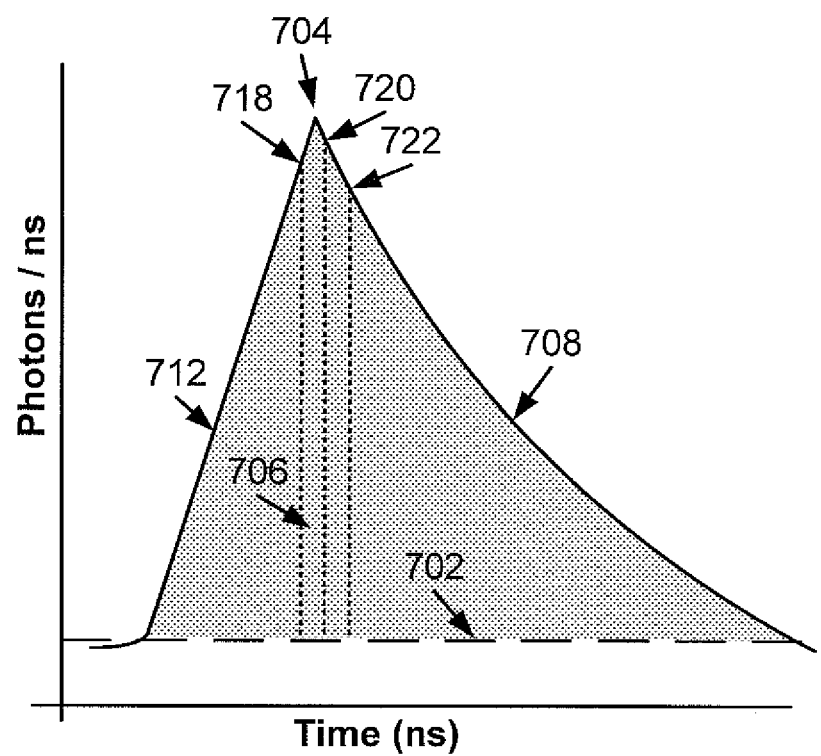
FIG. 7 includes a plot illustrating another particular embodiment of a shape of a neutron-induced electrical pulse.

For example, as illustrated in FIG. 7, an electronic pulse has a peak 704. Other than at the peak 704, the total area defined by the electrical pulse between a starting time and an ending time can be approximated by using the averages of each pair of two immediately adjacent readings and multiplying the averages times the corresponding time differences between such pairs of readings. At the peak 704, such an approximation may not be as accurate because no measurement may be taken at the peak 704 itself. Because the peak 704 may be higher than the highest reading obtained, using the average of two readings times the time difference would usually underestimate the area that includes the peak 704.

To determine the area near the peak 704, the pulse analyzer 120 may define a peak integration window 706 that extends a certain amount of time before, after, or a combination thereof, a highest reading, such as the reading 720. The readings corresponding to the electrical pulse can be analyzed to determine that reading 720 is the highest reading. The peak 704 may occur (1) at the highest known reading or (2) between the highest measurement and either the measurement immediately before or immediately after the highest known reading. Because the overall shape of the electrical pulse is generally known (faster rise time compared to a slower decay time), the peak 704 may be determined to have occurred between the reading 720 (highest reading) and a reading 718 (reading immediately before the highest reading), rather than between the reading 720 and a reading 722 (reading immediately after the highest reading). Thus, the integration window 706 can be defined by the times at the readings 718 and 720. In a particular embodiment, the integration window 706 may be at most 2 ns wide. The pulse analyzer 120 or pulse processing device 140 may use the highest reading 720 by itself or even a higher value when approximating the area within the integration window 706. Thus, the integration window 706 may more accurately estimate the total area, as compared to merely using averages of pairs of immediately adjacent readings (for example, the averages of the readings 718 and 720) when determining the integral over time of the total pulse at or above the threshold 702.

In another example, the peak can be approximated by calculating a slope of the rise 712 from the threshold 702 to a highest known reading that is continuous with the rise, and by calculating a slope of the decay 708 from the threshold 702 to a highest known reading that is continuous with the decay 708. The rise 712 and the decay 708 can each be extended, according to its slope, and the intersection of the two can be approximated as the peak of the electrical pulse. Other techniques can be used to account for the peak of the electrical pulse, such as a smoothing function that approximates a time at which the peak occurs.

After calculating the integrals, the pulse analyzer 120 can calculate a ratio of the integral over time of the particular portion of the electrical pulse to the integral over time of the total electrical pulse at or above the threshold. The pulse analyzer 120 can return the ratio as a variable and compare it to a predetermined value. If the ratio is at least the predetermined value, the electrical pulse can correspond to a neutron-induced electrical pulse. If the ratio is less than the predetermined value, the electrical pulse can correspond to a gamma radiation-induced electrical pulse. Skilled artisans will recognize that other positions of ratios relative to a threshold can indicate whether an electrical pulse corresponds to a neutron-induced electrical pulse or a gamma radiation-induced electrical pulse.

The pulse analyzer 120 can be adapted to send an indicator to the pulse counter 130 or the pulse processing device 140, which indicates that the electrical pulse corresponds to a gamma radiation-induced electrical pulse or a neutron-induced electrical pulse. In an example, the indicator can be a one or a zero when the electrical pulse corresponds to a neutron-induced electrical pulse, and can be the other of one or zero when the electrical pulse corresponds to a gamma radiation-induced electrical pulse. The pulse analyzer 120 can send a one via an output 132 and a zero via another output 134. In a non-limiting embodiment, the pulse counter 130 the pulse processing device 140, or another device communicating with both, can generate separate neutron and gamma radiation spectra, based on indicators received from the pulse analyzer 120.

In another embodiment, the indicator can be a replicate of the electrical pulse. For instance, the pulse analyzer 120 can send an analog output, such as an analog replicate of the electrical pulse or another analog signal via an output 132, when the electrical pulse corresponds to a neutron-induced electrical pulse. The pulse analyzer 120 can send the replicate of the electrical pulse or another analog signal via another output 134, when the electrical pulse corresponds to a gamma radiation-induced electrical pulse.

In a non-limiting embodiment, a threshold, a peak integration window, a predetermined value, another parameter, or any combination thereof can be adjustable at the pulse analyzer 120. For instance, a parameter can be adjusted based on a property of the scintillating material 107. In an example, a threshold can be adjusted depending on a relative decay time for a neutron-induced pulse compared to a relative decay time for a gamma radiation-induced pulse, with respect to a particular scintillating material that is responsive to both neutrons and gamma radiation. If a threshold is set too low, pulse shape may be difficult to analyze for a scintillating material or application that has a relatively higher noise level. If the threshold is set too high, however, pulse shape may not be identifiable enough to distinguish neutron-induced pulses from gamma radiation-induced electrical pulses for a scintillating material characterized by a less intense electrical pulse. Thus, adjustment of the threshold can assist in pulse identification by balancing reduction of noise with accuracy and speed of correctly identifying the pulse shape for different scintillating materials.

In another example, the pulse analyzer 120 can include a field programmable gate array (FPGA)-based system that is adapted to calculate integrals of the particular portion and the total pulse within user-definable windows. For instance, the FPGA-based system can calculate the integral over time of the decay of the electrical pulse within a tail-window and calculate the integral over time of the total electrical pulse at or above the threshold within a total-window, respectively. The start and end of both the tail-window and the total-window can be variables whose values can be set by a user at run time.

Figure 2:
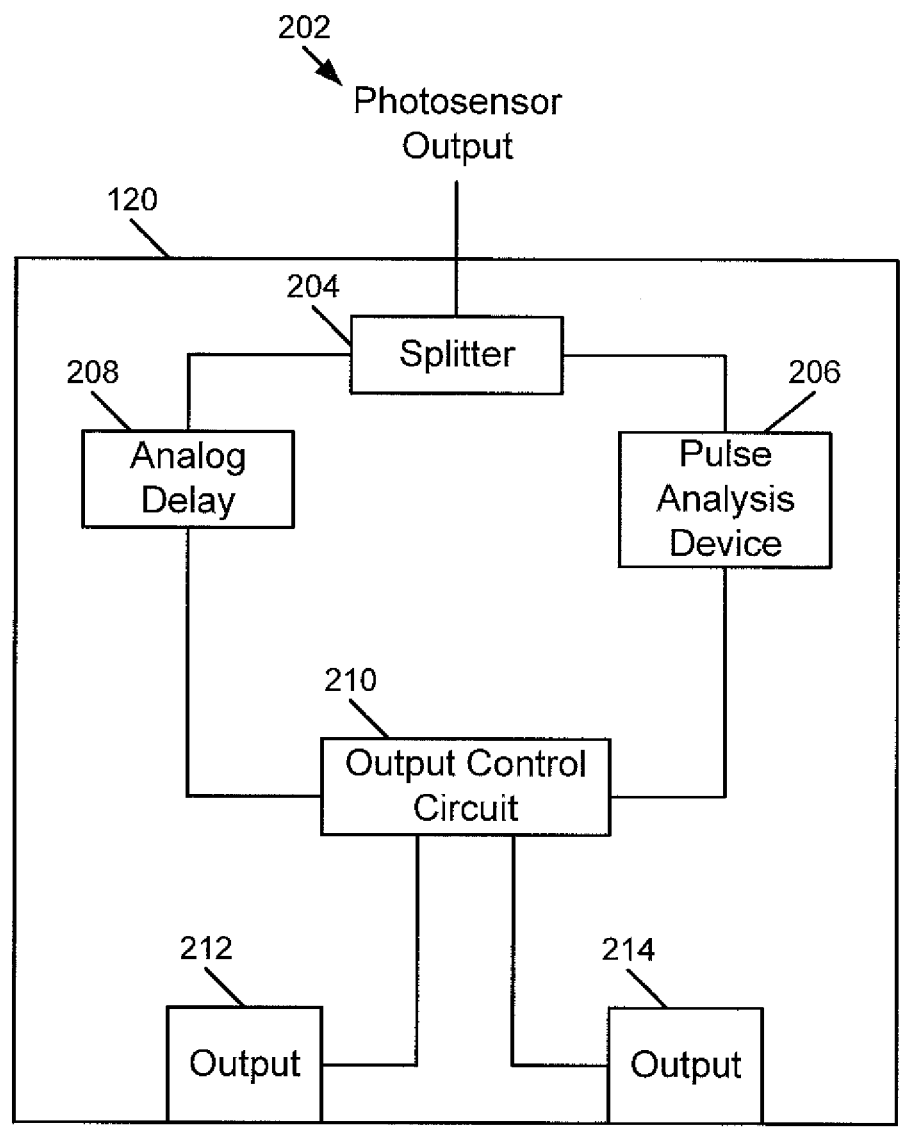
FIG. 2 includes a block diagram illustrating an example embodiment of the pulse analyzer illustrated in FIG. 1.

Many embodiments of pulse analyzers that output an electrical pulse, another analog signal or another indicator from a particular output of a plurality of outputs, based on a ratio of calculated integrals, are possible. FIG. 2 illustrates an example embodiment of a pulse analyzer, such as the pulse analyzer 120 illustrated in FIG. 1. The pulse analyzer 120 can include a signal splitter 204 that communicates with a photosensor output 202. The splitter 204 is coupled to a pulse analysis device 206 and an analog delay circuit 208. In a particular embodiment, the pulse analysis device 206 can include an FPGA or another digital circuit, logic to perform functions associated with analyzing a shape or other characteristic of an electrical pulse, or any combination thereof. In an example, the pulse analysis device 206 can include an FPGA-based digital multichannel analyzer. The delay circuit 208 can include, for example, a resistor delayed with a transistor or operational amplifier. Other delay circuits may be used. The pulse analysis device 206 and the delay circuit 208 are coupled to an output control circuit 210, which is coupled to an output 212 and another output 214. The pulse analysis device 206, the delay circuit 208, the output control circuit 210, the outputs 212 and 214, or any combination thereof can be included within a single housing.

In a particular embodiment, the splitter 204 can receive an electrical pulse from the photosensor output 202. The splitter 204 can send a replicate of the electrical pulse to the pulse analysis device 206, and the splitter can send another replicate of the electrical pulse to the analog delay circuit 208. The pulse shape analysis device 206 can calculate an integral over time of a particular portion of the electrical pulse and can calculate an integral over time of a total pulse at or above a threshold. The pulse analysis device 206 can calculate a ratio of the integral over time of the particular portion to the integral over time of the total pulse and can compare the ratio to a predetermined value, in order to determine whether the electrical pulse corresponds to a neutron-induced electrical pulse or a gamma radiation-induced electrical pulse. For instance, if the ratio is at least the predetermined value, the electrical pulse can correspond to the neutron-induced electrical pulse. Whereas, if the ratio is below the predetermined value, the electrical pulse can correspond to the gamma radiation-induced electrical pulse.

In a particular embodiment, the pulse analysis device 206 can send a logic pulse to the output control circuit 210 when the electrical pulse corresponds to a neutron-induced electrical pulse. In another embodiment, the pulse analysis device 206 can send a logic pulse to the output control circuit 210 when the electrical pulse corresponds to a gamma radiation-induced electrical pulse. The output control circuit 210 can receive the other replicate of the electrical pulse from the analog delay circuit 208 after the pulse analysis device 206 has determined whether the electrical pulse corresponds to a neutron-induced electrical pulse or a gamma radiation-induced electrical pulse. The output control circuit 210 can determine whether to send the electrical pulse to the output 212 or the output 214 based on the logic pulse. For example, when the output control circuit 210 receives a logic pulse, it can send the other replicate of the electrical pulse to the output 212. When the output control circuit 210 does not receive a logic pulse, it can send the other replicate of the electrical pulse to the output 214. The pulse analyzer 120 can thus output an analog replicate of the electrical pulse received from the photosensor output 202, via one of the outputs 212 and 214, based on whether the electrical pulse corresponds to a neutron-induced electrical pulse or a gamma radiation-induced electrical pulse.

Figure 8:
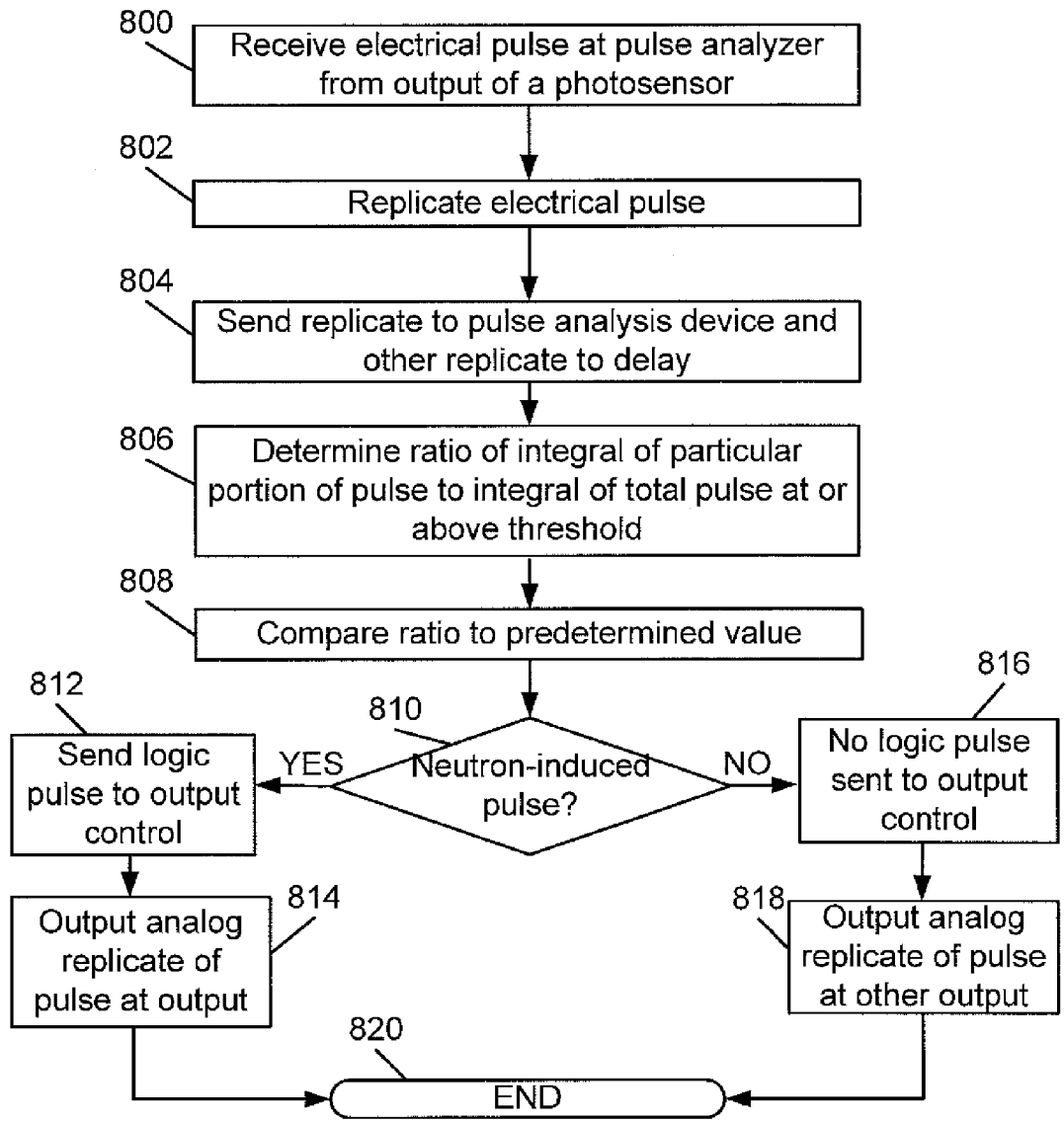
FIG. 8 includes a flow diagram illustrating a particular embodiment of a method of analyzing an electrical pulse output by a radiation detector.

FIG. 8 illustrates a particular embodiment of a method of analyzing an electrical pulse output by a radiation detector. At 800, a pulse analyzer receives an electrical pulse from an output of a photosensor at a radiation detector. Moving to 802, the pulse analyzer replicates the electrical pulse. Proceeding to 804, the pulse analyzer sends a replicate of the electrical pulse to a pulse analysis device and sends another replicate to an analog delay circuit. Continuing to 806, the pulse analysis circuit determines a ratio of an integral over time of a particular portion of the electrical pulse, to an integral over time of a combination of a total pulse at or above a threshold. Advancing to 808, the pulse analysis circuit compares the ratio to a predetermined value.

At 810, the pulse analysis device determines whether the electrical pulse corresponds to a neutron-induced pulse. If so, the method can move to 812, and the pulse analysis device can send a logic pulse to an output control circuit. Proceeding to 814, the pulse analyzer can output an analog replicate of the electrical pulse via an output. Returning to 810, if the pulse analysis device determines that the electrical pulse does not correspond to a neutron-induced pulse, the method can move to 816, and the pulse analysis device can send no logic pulse to the output control circuit. The method can proceed to 818, and the pulse analyzer can output an analog replicate of the electrical pulse via another output. The method can terminate at 820.

Figure 9:
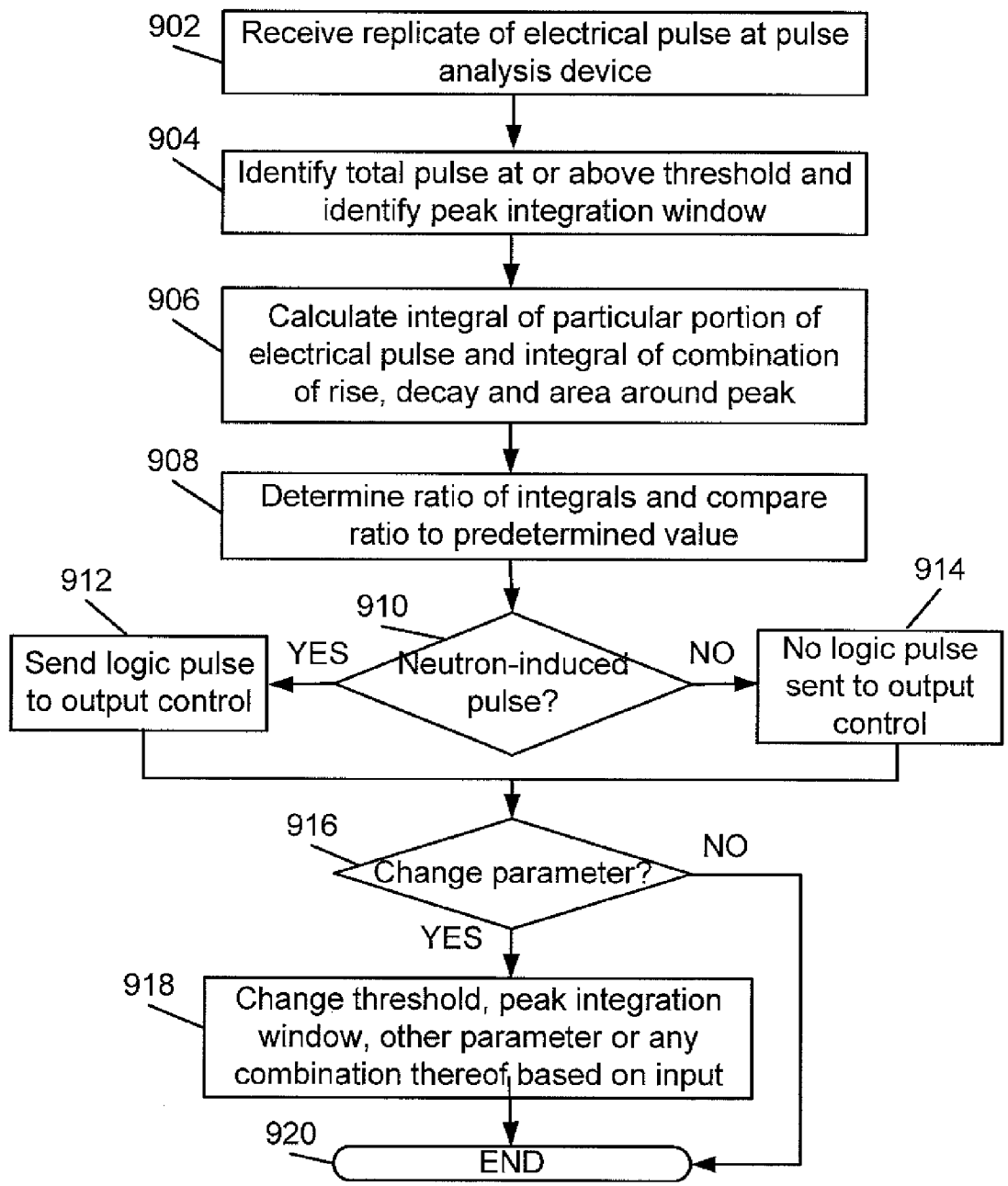
FIG. 9 includes a flow diagram illustrating a particular embodiment of a method of analyzing an electrical pulse output by a radiation detector.

FIG. 9 illustrates another particular embodiment of a method of analyzing an electrical pulse output by a radiation detector, such as an analysis performed by the pulse analysis device illustrated at 120 in FIG. 2 and referred to with respect to the electrical pulse as illustrated in FIG. 6. At 902, the pulse analysis device can receive a replicate of an electrical pulse. Moving to 904, the pulse analysis device can identify a total pulse at or above a threshold. For instance, the pulse analysis device can identify an earliest reading and a latest reading of the electrical pulse that are at or above the threshold. The pulse analysis device can also determine an integration window relative to a peak of the electrical pulse.

Proceeding to 906, the pulse analysis device can calculate an integral over a particular time period of a particular portion of the electrical pulse. The pulse analysis device can also calculate another integral over a larger time period to include most of the total pulse. For each integral, only those portions of the electrical pulse at or above the threshold may be used. The other integral over the larger time period may include the peak integration window as previously described. In a particular embodiment, background noise is subtracted from the electrical pulse. Alternatively, a pulse offset can be set to zero before the integrals are calculated. Continuing to 908, the pulse analysis device can determine a ratio of the integrals and compare the ratio to a predetermined value. Advancing to 910, the pulse analysis device can determine whether the electrical pulse corresponds to a neutron-induced pulse. If so, the pulse analysis device can send a logic pulse to an output control circuit at 912. Otherwise, the pulse analysis device may not send a logic pulse to an output control circuit at 914.

At 916, in a non-limiting embodiment, the pulse analysis device can determine whether it has received input to change a parameter of pulse analysis. For instance, a threshold, a predetermined value, a peak integration window, another parameter, or any combination thereof can be adjustable at the pulse analysis device. If the pulse analysis device has received input to change a parameter, the method can proceed to 918, and the pulse analysis can change the threshold, a predetermined value, the peak integration window, the other parameter, or any combination thereof based on the input. The method terminates at 920.

In accordance with particular embodiments and structure disclosed herein, a radiation detection system is provided that can include a pulse analyzer to identify an electrical pulse output by a photosensor as corresponding to a neutron-induced pulse or a gamma radiation-induced pulse, by comparing a predetermined value to a ratio of an integral over time of a particular portion of the electrical pulse, to an integral over time of a total pulse at or above a threshold over time (tailto-total integral ratio). Neutron-induced pulses typically have longer decay portions, for example, than gamma radiation-induced pulses, resulting in a larger ratio than the ratio for a gamma radiation-induced pulse. Thus, if the ratio is at least the predetermined value, the electrical pulse can correspond to the neutron-induced pulse, and if the ratio is below the predetermined value, the electrical pulse can correspond to the gamma radiation-induced pulse.

Skilled artisans will recognize that a ratio of an integral over time of the total pulse at or above the threshold to an integral over time of the particular portion may be used. For example, a total-to-tail integral ratio may be used, in which case a ratio that is at least a predetermined value can indicate that an electrical pulse corresponds to a gamma radiation-induced pulse.

In a particular embodiment, the pulse analyzer can output an analog replicate of the electrical pulse via an output or another output, based on whether the electrical pulse corresponds to a neutron-induced pulse or a gamma radiation-induced pulse.

In a particular embodiment, the pulse analyzer can be adjusted to compliment virtually any organic or inorganic scintillator that is sensitive to both neutrons and gamma radiation. For instance, a radiation detector using a CLYC (cerium-doped cesium lithium yttrium chloride elpasolite ($Cs_2LiYCl_6$(Ce))) scintillating material may emit electrical pulses having a decay portion of approximately 1 µs for a neutron-induced pulse and a decay portion of approximately 100 ns for a gamma radiation-induced electrical pulse. On the other hand, a radiation detector using a phosphor screen based on ZnS (Ag) and $^6$Li as a scintillating material may emit electrical pulses having a decay portion of approximately 40 ns for a neutron-induced pulse and a decay portion of approximately 20 ns for a gamma radiation-induced electrical pulse.

In a particular embodiment, a user may adjust a start time, an end time, for a decay portion, a rise portion, a total pulse, or any combination thereof, before determining integrals or ratios thereof. A predetermined value can be adjusted to determine whether a ratio of integrals indicates that an electrical pulse corresponds to a neutron-induced pulse or a gamma radiation-induced electrical pulse. In an example, a user utilizing CLYC as a scintillator may choose to calculate a tail integral over a 300 ns portion of a decay, starting at or about a peak of an electrical pulse. A sample tail-to-total integral for a neutron induced electrical pulse may be approximately 0.94 mV.ns/4.71 mV.ns, or approximately 0.20. Whereas, a tail-to-total integral for a gamma radiation-induced electrical pulse may be 0.30 mV.ns/0.56 mV.ns, or approximately 0.54. Thus, in this example, a user may choose to set the predetermined value at 0.35, to determine whether a ratio of integrals indicates that an electrical pulse corresponds to a neutron-induced pulse or a gamma radiation-induced electrical pulse.

In another example, a user utilizing $^6$Li and ZnS as a scintillating material may choose to calculate a tail integral over a 10 ns portion of a decay, starting at or about a peak of an electrical pulse. A sample tail-to-total integral for a neutron induced electrical pulse may be approximately 0.019 mV.ns/0.082 mV.ns, or approximately 0.236. Whereas, a tail-to-total integral for a gamma radiation-induced electrical pulse may be 0.00163 mV.ns/0.00485 mV.ns, or approximately 0.3371. Thus, in this example, a user may choose to set the predetermined value at 0.28, to determine whether a ratio of integrals indicates that an electrical pulse corresponds to a neutron-induced pulse or a gamma radiation-induced electrical pulse.

The example integration values and ratios described above are intended only to illustrate exemplary differences in ratios between electrical pulses induced by neutrons as opposed to gamma radiation and not to limit the concepts described herein. Integral values and ratios may vary significantly as a user changes scintillating materials and adjusts a time window over which a decay portion, rise portion, total pulse, or any combination thereof, is integrated. Hence, the ability of a user to adjust the predetermined value to evaluate a ratio provides the user with the flexibility to account for scintillating material and for the user's desire to include or exclude a variety of electrical pulse portions when determining whether an electrical pulse corresponds to a neutron-induced pulse, a gamma radiation-induced electrical pulse, a noise pulse or another pulse type.

Many different aspects and embodiments are possible. Some of those aspects and embodiments are described below. After reading this specification, skilled artisans will appreciate that those aspects and embodiments are only illustrative and do not limit the scope of the present invention. Additionally, those skilled in the art will understand that some embodiments that include analog circuits can be similarly implemented using digital circuits, and vice versa.

In a first aspect, a radiation detection system can include a photosensor to receive light from a scintillator via an input and to send an electrical pulse at an output in response to receiving the light. The radiation detection system can also include a pulse analyzer that can determine whether the electrical pulse corresponds to a neutron-induced pulse, based on a ratio of an integral of a particular portion of the electrical pulse to an integral of a combination of a decay portion and a rise portion of the electrical pulse. Each of the integrals can be integrated over time. In an embodiment of the first aspect, the particular portion can consist essentially of the decay portion. The pulse analyzer can be configured to compare the ratio with a predetermined value and to identify the electrical pulse as a neutron-induced pulse when the ratio is at least the predetermined value.

In an embodiment of the first aspect, the particular portion consists essentially of the decay portion. In another embodiment, the pulse analyzer is configured to compare the ratio with a predetermined value and to identify the electrical pulse as a neutron-induced pulse when the ratio is at least the predetermined value. In a particular embodiment, the pulse analyzer is configured to compare the ratio with the predetermined value, and identify the electrical pulse as a gamma radiation-induced pulse when the ratio is less than the predetermined value. In another particular embodiment, the pulse analyzer is configured to return the ratio as a variable and to compare the variable to the predetermined value. In still another embodiment, the decay portion and the rise portion include portions of the electrical pulse that are at or above a threshold. In a particular embodiment, the threshold is adjustable at the pulse analyzer.

In a further embodiment of the first aspect, the combination of the decay portion and the rise portion includes a peak of the electrical pulse. In still a further embodiment, the combination of the decay portion and the rise portion includes a peak integration window defined by a first time at that corresponds to a highest reading of the electrical pulse and a second time that corresponds to a reading that is immediately before or immediately after the highest reading. In a particular embodiment, a peak integration window has a width that is adjustable at the pulse analyzer. In yet a further embodiment, the pulse analyzer includes an FPGA. In a particular embodiment, the pulse analyzer includes an FPGA-based multichannel analyzer.

In another embodiment of the first aspect, the pulse analyzer is configured to send an indicator to a pulse processing device, wherein the indicator indicates whether the electrical pulse corresponds to the neutron-induced pulse or to the gamma radiation-induced pulse. In a particular embodiment, the pulse analyzer is configured to send the indicator via a first output when the electrical pulse corresponds to the neutron-induced pulse, and to send the indicator via a second output when the electrical pulse corresponds to the gamma radiation-induced pulse. In a more particular embodiment, the indicator is one or zero when the electrical pulse corresponds to the neutron-induced pulse, and wherein the indicator is the other of one or zero when the electrical pulse corresponds to the gamma radiation-induced pulse. In another more particular embodiment, the indicator includes a first replicate of the electrical pulse. In an even more particular embodiment, the first replicate includes an analog replicate of the electrical pulse.

In another even more particular embodiment of the first aspect, the pulse analyzer includes a splitter to replicate the electrical pulse and to send the first replicate to a delay circuit and to send a second replicate to a pulse analysis device, and an output control circuit to receive the first replicate from the delay circuit after the pulse analysis device has calculated the integrals, wherein the output control circuit is configured to send the first replicate to the first output after receiving a logic pulse from the pulse analysis device and to send the first replicate to the second output when a logic pulse is not received from the pulse analysis device. In a still even more particular embodiment, the pulse analysis device is configured to send the logic pulse when the ratio is at least a predetermined value. In another still even more particular embodiment, the pulse analysis device and the output control circuit are within a single housing.

In a second aspect, a method can include receiving an electrical pulse at a pulse analyzer from a photosensor of a radiation detection device. The method can also include determining whether the electrical pulse corresponds to a neutron-induced pulse or a gamma radiation-induced pulse, based on a ratio of an integral of a particular portion of the electrical pulse to an integral of a combination of a decay portion and a rise portion of the electrical pulse. Each of the integrals can be integrated over time, and the decay portion and the rise portion can be above a threshold. The method can also include sending an indicator to a pulse processing device, the indicator identifying the electrical pulse as corresponding to a neutron-induced pulse or a gamma radiation-induced pulse. In an embodiment of the second aspect, the particular portion can consist essentially of the decay portion.

In an embodiment of the second aspect, the particular portion consists essentially of the decay portion. In another embodiment, the method further includes comparing the ratio with a predetermined value and identifying the electrical pulse as a neutron-induced pulse when the ratio is at least the predetermined value. In a more particular embodiment, the method further includes comparing the ratio with the predetermined value and identifying the electrical pulse as a gamma radiation-induced pulse when the ratio is less than the predetermined value. In still another embodiment, the method further includes defining a peak integration window to include a highest reading of the electrical pulse and another reading immediately before or immediately after the highest reading. In a particular embodiment, the peak integration window has a width that is at most 2 ns. In yet another embodiment, the method further includes returning the ratio as a variable and comparing the variable to a predetermined value. In a particular embodiment, the method further includes receiving input indicating a value at the pulse analyzer and changing the predetermined value to the indicated value.

In a further embodiment of the second aspect, the method further includes sending an indicator to a pulse processing device wherein the indicator indicates whether the electrical pulse corresponds to the neutron-induced pulse or to a gamma radiation-induced pulse. In a particular embodiment, the method further includes sending the indicator from the pulse analyzer via a first output when the electrical pulse corresponds to the neutron-induced pulse, and sending the indicator via a second output when the electrical pulse corresponds to the gamma radiation-induced pulse. In a more particular embodiment, the indicator includes one or zero when the electrical pulse corresponds to a neutron-induced pulse and the indicator is the other of one or zero when the electrical pulse corresponds to a gamma radiation-induced pulse. In an even more particular embodiment, the method further includes generating a neutron spectrum, a gamma radiation spectrum or any combination thereof, at a pulse processor based on a plurality of ones, zeros, or any combination thereof received from the pulse analyzer.

In another particular embodiment of the second aspect, the indicator includes an analog output. In a particular embodiment, the method further includes replicating the first electrical pulse at the pulse analyzer to form a second pulse, sending one of the first and second electrical pulses to a pulse analysis device of the pulse analyzer and sending the other of the first and second electrical pulses to a delay circuit of the pulse analyzer, and sending a logic pulse from the pulse analysis device to an output control circuit, when the ratio is at least a predetermined value. In a more particular embodiment, the method further includes receiving the other of the first and second electrical pulses at the output control circuit after the pulse analysis device has calculated the integrals, and sending the other of the first and second electrical pulses to a first output after receiving the logic pulse from the pulse analysis device and sending the other of the first and second electrical pulses to the second output when the logic pulse from the pulse analysis device is not received.

Note that not all of the activities described above in the general description or the examples are required, that a portion of a specific activity may not be required, and that one or more further activities may be performed in addition to those described. Still further, the order in which activities are listed is not necessarily the order in which they are performed.

In a particular embodiment, a method may be described in a series of sequential actions. The sequence of the actions and the party performing the actions may be changed without departing from the scope of the teachings unless explicitly stated to the contrary. Actions may be added, deleted, or altered. Also, a particular action may be iterated. Further, actions within a method that are disclosed as being performed in parallel may be performed serially, and other actions within a method that are disclosed as being performed serially may be performed in parallel.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A radiation detection system comprising:
a photosensor to receive light from a scintillator via an input and to send an electrical pulse at an output in response to receiving the light; and
a pulse analyzer comprising a circuit that is adapted to calculate the integral over time of at least a portion of a decay portion of an electrical pulse and the integral over time of the combination of the decay portion and a rise portion of the electrical pulse and to determine whether the electrical pulse corresponds to a neutron-induced pulse, based on a ratio of the integral of at least a portion of the decay portion of the electrical pulse to an integral of a combination of the decay portion and the rise portion of the electrical pulse.

2. The radiation detection system of claim 1, wherein the pulse analyzer is configured to compare the ratio with a predetermined value and to identify the electrical pulse as a neutron-induced pulse when the ratio is at least the predetermined value.

3. The radiation detection system of claim 2, wherein the pulse analyzer is configured to return the ratio as a variable and to compare the variable to the predetermined value.

4. The radiation detection system of claim 1, wherein the decay portion and the rise portion include portions of the electrical pulse that are at or above a threshold.

5. The radiation detection system of claim 1, wherein the combination of the decay portion and the rise portion includes a peak of the electrical pulse.

6. The radiation detection system of claim 1, wherein the combination of the decay portion and the rise portion includes a peak integration window defined by a first time that corresponds to a highest reading of the electrical pulse and a second time that corresponds to a reading that is immediately before or immediately after the highest reading.

7. The radiation detection system of claim 6, wherein a peak integration window has a width that is adjustable at the pulse analyzer.

8. The radiation detection system of claim 1, wherein the pulse analyzer includes a field programmable gate array (FPGA).

9. The radiation detection system of claim 1, wherein the pulse analyzer is configured to send an indicator to a pulse processing device, wherein the indicator indicates whether the electrical pulse corresponds to the neutron-induced pulse or to the gamma radiation-induced pulse.

10. The radiation detection system of claim 9, wherein the indicator comprises a first replicate of the electrical pulse.

11. The radiation detection system of claim 10, wherein the first replicate comprises an analog replicate of the electrical pulse.

12. The radiation detection system of claim 10, wherein the pulse analyzer includes:
a splitter to replicate the electrical pulse and to send the first replicate to a delay circuit and to send a second replicate to a pulse analysis device; and
an output control circuit to receive the first replicate from the delay circuit after the pulse analysis device has calculated the integrals, wherein the output control circuit is configured to send the first replicate to the first output after receiving a logic pulse from the pulse analysis device and to send the first replicate to the second output when a logic pulse is not received from the pulse analysis device.

13. The radiation detection system of claim 1 wherein the digital logic circuit comprises a field programmable gate array.

14. A method comprising:
receiving an electrical pulse at a pulse analyzer from a photosensor of a radiation detection device;
defining a peak integration window to include a highest reading of the electrical pulse and another reading immediately before or immediately after the highest reading;
determining whether the electrical pulse corresponds to a neutron-induced pulse or a gamma radiation-induced pulse, based on a ratio of an integral of a particular portion of the electrical pulse to an integral of a combination of a decay portion and a rise portion of the electrical pulse, wherein each of the integrals is integrated over time and the decay portion and the rise portion are at or above a threshold; and
sending an indicator to a pulse processing device, the indicator identifying the electrical pulse as corresponding to a neutron-induced pulse or a gamma radiation-induced pulse.

15. The method of claim 14, wherein the particular portion consists of the decay portion.

16. The method of claim 14, further comprising comparing the ratio with a predetermined value and identifying the electrical pulse as a neutron-induced pulse when the ratio is at least the predetermined value.

17. The method of claim 14, wherein the peak integration window has a width that is at most 2 ns.

18. A method comprising:
receiving a first electrical pulse from a photosensor of a radiation detection device;
replicating the first electrical pulse to form a second pulse;
sending the first electrical pulse to a pulse analysis device and sending the second pulse to a delay circuit;
calculating with the pulse analysis device a ratio of the integral over time of the particular portion of the first electrical pulse to the integral over time of the total pulse and comparing the ratio to a predetermined value, in order to determine whether the electrical pulse corresponds to a neutron-induced electrical pulse or a gamma radiation-induced electrical pulse; and
sending a logic pulse from the pulse analysis device to an output control circuit indicating that the electrical pulse corresponds to a neutron-induced electrical pulse when the ratio is at least a predetermined value.

19. The method of claim 18, further comprising:
receiving the second pulse at the output control circuit after the pulse analysis device has calculated the integrals; and
sending the second electrical pulse to a first output after receiving a logic pulse from the pulse analysis device indicating that the electrical pulse corresponds to a neutron-induced electrical pulse and sending the second pulse to a second output when the logic pulse from the pulse analysis device is not received.

20. The method of claim 18, further comprising:

receiving the second pulse at the output control circuit after the pulse analysis device has calculated the integrals; and sending the second electrical pulse to a first output after receiving a logic pulse from the pulse analysis device indicating that the electrical pulse corresponds to a neutron-induced electrical pulse and sending the second pulse to a second output after receiving a logic pulse from the pulse analysis device indicating that the electrical pulse corresponds to a gamma radiation-induced electrical pulse.

* * * * *